Patented Feb. 19, 1952

2,585,901

UNITED STATES PATENT OFFICE 2,585,901

METHOD OF ISOTOPE ANALYSIS

Gerhard H. Dieke, Baltimore, Md., assignor to the United States of America as represented by the United States Atomic Energy Commission No Drawing. Application November 21, 1945, Serial No. 630,125

8 Claims. (Cl. 23—230)

This invention relates to isotope analysis and more particularly to a novel spectrometric method of determining the isotopic composition of an element.

In recent years there has been considerable interest in processes for separating the isotopes of various chemical elements. Much of this interest has centered on methods for separating the isotopes of uranium to obtain the uranium isotope of mass 235 for use in the production of atomic energy, and numerous methods of separating the uranium isotopes have been proposed. There has also been interest in various methods of altering the natural isotopic abundance of other elements such as oxygen, nitrogen and carbon. These and other elements when enriched with respect to particular isotopes may be used, for example, as tracers in physiological studies and for other purposes.

As an incident of such isotope separation and concentration processes it is frequently desirable to make analyses of isotopic composition because of the fact that such analyses are useful in achieving efficient operation and effective control of the separation and concentration processes. The problems involved in performing an accurate isotope analysis are to a considerable extent analogous to the problems encountered in performing an isotope separation. Since isotopes are merely different forms of the same chemical element, conventional techniques of chemical analysis cannot be effectively used. Furthermore the isotopes of an element generally resemble each other closely in their physical characteristics and therefore the problem of performing an accurate isotope analysis is a very difficult one.

It is an object of the present invention to provide a simple, effective and accurate method of determining the isotopic composition of an element.

It is another object of the invention to provide a novel spectrometric method of isotope analysis, i. e., a method wherein the isotopic composition of an element is determined from corresponding spectral lines characteristic of the isotopes of the element.

Other objects of the invention will be in part obvious and in part pointed out hereinafter.

In one of its broader aspects the present invention comprises a method of determining the isotopic composition of an element by incorporating the element in a substance adapted to enhance the separation of corresponding spectral lines characteristic of the isotopes of the element, producing a spectrum of this substance including such corresponding lines and obtaining from the corresponding lines of the spectrum an indication of the isotopic composition of the element. As conducive to a clearer understanding of the method of the invention it may be pointed out that chemical substances can absorb or emit radiation only at certain energy levels and that the wave lengths of such emitted or absorbed radiation are characteristic of the structure and composition of such substances. Although the isotopes of an element are substantially identical in many of their characteristics and properties they normally differ somewhat in the structure and composition of their atomic nuclei. More specifically isotopes ordinarily differ in two respects which influence the character of the radiation they absorb or emit, i. e., mass and nuclear spin. Thus the wave length of the radiation absorbed or emitted by a given element may vary slightly with its isotopic composition and hence the spectrum of the element will exhibit corresponding differences. These differences may show up in the spectrum as a displacement of corresponding lines attributable to the different isotopes of the element. If a qualitative determination of isotopic composition is desired the necessary determination may be made by merely observing and identifying the lines characteristic of the different isotopes. If, on the other hand, a quantitative determination is desired a measurement of the relative or in some cases, the absolute intensities of the spectral lines may be taken as a measure of the relative abundance of the different isotopes present in the element.

In attempting to make such a determination of isotopic composition from the displacement of analogous or corresponding spectral lines a problem arises out of the fact that in many instances the displacement for different isotopes of an element is so small as to preclude accurate results. In accordance with the present method this difficulty is overcome by incorporating the element of unknown isotopic composition in a substance, usually a chemical compound, which is capable of enhancing the separation of the corresponding spectral lines characteristic of the isotopes of the element. It has been found, for example, that various uranyl salts are capable of increasing the separation of corresponding spectral lines due to the isotopes of elements contained in the uranyl salts and that by incorporating elements such as uranium, oxygen and nitrogen in an appropriate uranyl salt displacements are obtained of analogous lines in the absorption and fluorescence spectra of such compounds which are of sufficient magnitude to permit reliable analysis. The preparation of the uranyl salt may be effected by conventional chemical methods and the spectrum of the element produced by utilizing conventional spectrographic techniques. It has been found that the sharpness of the absorption and fluorescence spectra of the uranyl salts is improved substantially at low temperatures and accordingly the present method is preferably carried out at temperatures of the order of 20° K. to 80° K. It should be understood however that this temperature range is not critical and that satisfactory results may be obtained at temperatures not within the stated range.

As previously indicated, the present method may be used for either qualitative or quantitative isotope analysis. When the method is used to obtain quantitative results a number of alternative procedures may be used. Thus the relative abundance of the isotopes of an element may be determined by determining the relative intensities of corresponding spectral lines and more particularly by determining the ratio of the intensities of a pair of corresponding lines as a measure of the ratio of the concentrations of isotopes producing those lines. In other cases, as for example where a large number of similar determinations are to be made, the absolute intensity of one line may be measured by a suitably calibrated light responsive device to indicate the concentration of the particular isotope producing that line. In still other cases it may be desirable to compare the intensity of a particular line corresponding to a particular isotope with a line produced by a sample of known isotopic composition to determine the concentration of the particular isotope in an unknown sample.

Various methods of measuring the intensity of spectral lines may be used and the present invention is not limited to any particular method. Visual inspection of the spectrum gives a rough indication of relative intensity and hence composition although it will be apparent that such visual inspection is unsatisfactory where precise quantitative results are desired. A more accurate determination may be obtained by photographing the appropriate section of the spectrum and determining the relative intensities of the desired lines from the photograph. This method although more accurate than visual inspection is tedious and still leaves something to be desired where precise results are sought. More accurate results may be obtained in a rapid and efficient manner by the use of a photoelectric apparatus of the type disclosed in an article by Dieke and Crosswhite in the Journal of the Optical Society, vol. 35, No. 7 pages 471 to 480, July 1945. In accordance with the method disclosed in this publication a light sensitive tube such as a photomultiplier tube is positioned to receive light through a slit of predetermined width located at the focus of the spectral line or lines of which the intensities are to be measured. The tube is preferably so mounted as to scan the spectral lines and the output of the tube is transmitted either directly or through an intermediate amplifier to a suitable meter, for example, a recording microammeter. Since the current produced by the tube is a function of the intensity of the spectral line being scanned the record on the microammeter indicates the intensity of the line and hence the abundance of the isotope producing the line. Since there are many factors such as variations in the light source, variations in the condition of the sample etc. which tend to alter the absolute intensity of the spectral lines it is ordinarily desirable to compare the intensity of a pair of corresponding lines thus eliminating errors of this character. When using the photoelectric apparatus referred to, the ratio of the intensity of a pair of corresponding lines may be determined either by measuring the individual intensities of the lines and computing the ratio or preferably by connecting a pair of phototubes responsive to the different line intensities in the well known Wheatstone bridge circuit so that the ratio of the two intensities may be measured directly.

In cases where a uranyl salt is used to enhance the separation of corresponding spectral lines the isotopic abundance of a number of elements may be determined simultaneously. Thus isotope analyses of uranium and oxygen may be made using any uranyl salt. Uranyl nitrate may be used in the isotope analysis of nitrogen, uranyl chloride in the case of chlorine, and uranyl carbonate in the case of carbon. Other uranyl compounds may be used in the analysis of still other elements where such elements can be incorporated in a suitable uranyl compound.

The spectrum used may be either an absorption spectrum or a fluorescence spectrum. In general the fluorescence spectrum is preferable since it may be effectively obtained with the salt in relatively finely divided crystalline condition thus making it unnecessary to go through the procedure of preparing large precisely formed crystals. In determining the isotopic composition of oxygen or nitrogen the fluorescence spectrum gives satisfactory results. In the case of uranium, however, the displacement of corresponding lines in the fluorescence spectrum is so small that it is preferable to use the absorption spectrum. Methods of preparing the large crystals required for obtaining such an absorption spectrum are known in the art.

In order to point out more fully the nature of the present method the following specific example is given of a procedure by means of which the abundance of the oxygen isotopes in an oxygen sample of unknown isotopic composition may be determined. A sample of cesium uranyl nitrate $CsUO_2(NO)_3$ was prepared by incorporating in uranyl nitrate a sample of oxygen and crystallizing the mixed salt from a solution containing cesium nitrate and the uranyl nitrate as thus prepared. The oxygen may be incorporated in the uranyl nitrate by conventional methods. For example, nitric acid may be prepared by causing the oxygen sample to react with ammonia and the resulting nitric acid used to dissolve uranium metal to produce uranyl nitrate. Relatively small crystals of the double salt were placed in a small tube which was inserted in a larger double-walled tube containing liquid hydrogen. The double-walled tube functioned in the manner of a Dewar flask to prevent excessive vaporization of the hydrogen and the hydrogen served to keep the sample of cesium uranyl nitrate at the desired low temperature. The sample was exposed to a suitable source of light, in this case an arc light and radiation from the sample was focused on the slit of a conventional spectrograph. In order to obtain the desired dispersion of the spectral lines it is desirable to use a spectrograph having a relatively high resolving power. In the present instance the spectrograph used had a 21-foot diffraction grating in a Wadsworth mounting which gave a dispersion of 4.8 Angstroms/mm. At the focus of the spectrum as produced by this instrument there was a second slit of adjustable width behind which there was a photomultiplier tube of the type previously referred to. It is a matter of some importance in obtaining accurate results that the width of this second slit be properly adjusted and in general the slit should be adjusted to the width of the widest line that is to be scanned by the phototube. In the present instance a slit width of 0.25 mm. is used.

In the fluorescence spectrum of cesium uranyl nitrate there are a number of pair of corresponding lines produced by the uranyl group and having displacements and intensities of such magnitude as to be satisfactory for determining the isotopic composition of the oxygen contained in the group. In cases where the $O^{18}$ content of the sample is small the number of molecules containing $UO^{18}O^{18}$ groups is negligible and hence the significant spectral lines will be those produced by $UO^{16}O^{16}$ groups and $UO^{16}O^{18}$ groups. A convenient pair of lines to use under these circumstances are the lines identified by the wave numbers 20205.58 cm.$^{-1}$ and 20242.69 cm.$^{-1}$. The former line is characteristic of the $UO^{16}O^{16}$ group and the latter line, which is displaced 37.11 wave numbers toward the blue end of the spectrum, is characteristic of $UO^{16}O^{18}$. Since the $O^{18}$ content of present sample was small the intensity of the $UO^{16}O^{18}$ line was much less than that of the $UO^{16}O^{16}$ line.

These two lines were scanned by the phototube and the current generated by the tube was amplified and recorded by a recording microammeter. The ratio of current intensities obtained was 37, i. e., the current generated when the phototube viewed the $UO^{16}O^{16}$ line was 37 times as great as when the tube viewed the $UO^{16}O^{18}$ line. This current ratio indicates that the sample contains 37 $UO^{16}O^{16}$ groups for each $UO^{16}O^{18}$ group and thus contains $2 \times 37 + 1 = 75$ $O^{16}$ atoms for each atom of $O^{18}$. Hence the $O^{18}$ content of the sample is about 1.34% of the $O^{16}$ content of the sample.

In order to determine the accuracy of the foregoing method, an oxygen sample known to contain 1.36% $O^{18}$ was incorporated in cesium uranyl nitrate as described above and analyzed by the foregoing method. The current density ratio was found to be 37 as before, thus indicating an $O^{18}$ content of 1.34% and demonstrating that the present method is accurate to about 2%.

It is to be understood that the foregoing description is illustrative only. In cases where the isotopic composition of uranium is to be determined the degree of separation between analogous lines that is obtained in the fluorescence spectrum is quite small and therefore it is preferable to use the absorption spectrum. Thus a single, large crystal of cesium uranyl chloride $Cs_2UO_2Cl_4$ may be inserted in the sample tube as described in the foregoing example and subjected to light source which in this case may be a lamp having an ordinary tungsten filament. The radiation from the sample is preferably polarized before it passes to the spectrograph. Separations between analogous lines produced by $U^{235}O_2$ groups and $U^{238}O_2$ groups of the order of 1.6 to 1.8 cm.$^{-1}$ have been obtained.

Since many embodiments might be made of the present invention and since many changes might be made in the embodiment described, it is to be understood that the foregoing description is to be interpreted as illustrative only and not in a limiting sense.

I claim:

1. A method of determining the isotopic composition of an element capable of being incorporated in a uranyl compound which comprises chemically incorporating said element in a uranyl compound to enhance the separation of corresponding spectral lines characteristic of the isotopes of said element, producing a spectrum of said compound including said corresponding lines and scanning at least one of said lines with a light sensitive tube to obtain an electric current as an indication of the relative abundance of said isotopes in said element.

2. A method of determining the isotopic composition of an element capable of being incorporated in a uranyl compound which comprises chemically incorporating said element in a uranyl compound to enhance the separation of corresponding spectral lines characteristic of the isotopes of said element, producing a spectrum of said compound including said corresponding lines and scanning at least two of said corresponding lines with a light sensitive tube to obtain a plurality of electric currents, the ratio of which serves as a measure of the relative abundance of said isotopes in said element.

3. A method of determining the isotopic composition of an element capable of being incorporated in a uranyl compound which comprises chemically incorporating said element in a cesium uranyl salt to enhance the separation of corresponding spectral lines characteristic of the isotopes of said element, producing a spectrum of said salt including said corresponding lines and scanning at least one of said lines with a light sensitive tube to obtain an electric current as an indication of the relative abundance of said isotopes in said element.

4. A method of determining the isotopic composition of an element capable of being chemically incorporated in a uranyl compound, which comprises incorporating said element in a uranyl compound to enhance the separation of corresponding spectral lines characteristic of the isotopes of said element, producing an absorption spectrum of said substance including said corresponding lines and scanning at least one of said lines with a light sensitive tube to obtain an electric current as an indication of the relative abundance of said isotopes in said element.

5. A method of determining the isotopic composition of an element capable of being chemically incorporated in a uranyl compound, which comprises incorporating said element in a uranyl compound to enhance the separation of corresponding spectral lines characteristic of the isotopes of said element, producing a fluorescence spectrum of said substance including said corresponding lines and scanning at least one of said lines with a light sensitive tube to obtain an electric current as an indication of the relative abundance of said isotopes in said element.

6. A method of determining the isotopic composition of oxygen of unknown isotopic composition which comprises chemically incorporating said oxygen in cesium uranyl nitrate to enhance the separation of corresponding spectral lines characteristic of the isotopes of oxygen, producing a fluorescence spectrum of said nitrate including said corresponding lines and scanning at least one of said lines with a light sensitive tube to obtain an electric current as an indication of the relative abundance of said oxygen isotopes.

7. A method of determining the isotopic composition of nitrogen of unknown isotopic composition which comprises chemically incorporating said nitrogen in cesium uranyl nitrate to enhance the separation of corresponding spectral lines characteristic of the isotopes of nitrogen, producing a fluorescence spectrum of said nitrate including said corresponding lines and scanning at least one of said lines with a light sensitive tube to obtain an electric current as an indication of the relative abundance of said nitrogen isotopes.

8. A method of determining the isotopic composition of uranium of unknown isotopic composition which comprises chemically incorporating said uranium in cesium uranyl chloride to enhance the separation of corresponding spectral lines characteristic of the isotopes of uranium, producing an absorption spectrum of said chloride including said corresponding lines and scanning at least one of said lines with a light sensitive tube to obtain an electric current as an indication of the relative abundance of said uranium isotopes.

GERHARD H. DIEKE.

REFERENCES CITED

The following references are of record in the file of this patent:

Satyanarayana, Fluorescence of Uranyl Salts, Chemical Abstracts, vol. 38, p. 6200 (1944).